United States Patent

Kennedy

[11] Patent Number: 6,021,059
[45] Date of Patent: Feb. 1, 2000

[54] INTEGRATED SYNCHRONOUS RECTIFIER FOR POWER SUPPLIES

[75] Inventor: Dennis M. Kennedy, Glendale, Ariz.

[73] Assignee: Honeywell Inc., Minneapolis, Minn.

[21] Appl. No.: 09/224,270

[22] Filed: Dec. 31, 1998

[51] Int. Cl.[7] .................................................. H02M 7/217
[52] U.S. Cl. ............................................. 363/127; 363/89
[58] Field of Search .................................. 363/84, 89, 81, 363/125, 127, 128, 53, 15

[56] References Cited

U.S. PATENT DOCUMENTS

| | | | |
|---|---|---|---|
| 4,409,543 | 10/1983 | Sugihara | 324/650 |
| 4,663,699 | 5/1987 | Wilkinson | 363/17 |
| 5,097,403 | 3/1992 | Smith | 363/127 |
| 5,126,651 | 6/1992 | Gauen | 323/222 |
| 5,396,412 | 3/1995 | Barlage | 363/89 |
| 5,552,695 | 9/1996 | Schwartz | 323/271 |
| 5,590,032 | 12/1996 | Bowman et al. | 363/15 |
| 5,742,491 | 4/1998 | Bowman et al. | 363/21 |
| 5,920,475 | 7/1999 | Boylan et al. | 363/127 |

*Primary Examiner*—Adolf Deneke Berhane

[57] ABSTRACT

A timing circuit generates timing signals for a synchronous rectifier directly from the transformer power output winding. A phase detector detects the phase of the voltage on the output winding. A switched current source generates a digital timing signal responsive to the phase detector. The output from the current source is applied to the gate of the rectifier to control the on/off condition of the rectifier.

3 Claims, 3 Drawing Sheets

INTEGRATED SYNCHRONOUS RECTIFIER FOR POWER SUPPLIES

BACKGROUND OF THE INVENTION

1. Technical Field

The present invention relates, generally, to a power supply having a synchronous rectifier configured to synchronize the output duty cycle as a function of voltage on the secondary winding and, more particularly, to an integrated synchronous rectifier configured to derive the timing of polarity reversals from the secondary winding and to generate a current source for controlling the output rectifier synchronously with the detected polarity reversals.

2. Background Art and Technical Problems

Power supplies are known to employ switching type power converters to provide a step-down rectified voltage to an electrical load. Self-synchronized rectifiers generally refer to rectifiers using MOSFET rectifying devices having control gates which are themselves controlled by the voltages of the secondary winding of the power transformer in order to provide the rectification of the output of the transformer. Presently known self-synchronized rectifiers, however, do not adequately accommodate the large variability of transformer voltages in forward type converters. In particular, if the voltage level on the secondary winding in the forward mode is too low, the MOSFET rectifying devices may not always turn on when needed. Conversely, for excessively high voltage levels, at the output winding, correspondingly high control voltages applied to the MOSFET rectifiers can destroy the rectifier.

Several attempts have been made to address the shortcomings associated with presently known synchronous rectifiers. See, for example, Rozman, U.S. Pat. No. 5,528,482, issued Jun. 18, 1996, entitled "Low Loss Synchronous Rectifier for Application to Clamped-Mode Power Converters"; Barlage, U.S. Pat. No. 5,396,412, issued Mar. 7, 1995, entitled "Synchronous Rectification and /Adjustment of Regulator Output Voltage"; Smith, U.S. Pat. No. 5,304,875, issued Apr. 19, 1994, entitled "Efficient Transistor Drive Circuit for Electrical Power Converter Circuits and the Like"; Schwartz, U.S. Pat. No. 5,552,695, issued Sep. 3, 1996, entitled "Synchronous Rectified Buck-Flyback DC to DC Power Converter"; Gauen, U.S. Pat. No. 5,126,651, issued Jun. 30, 1992, entitled "Gate Drive Circuit for a Synchronous Rectifier"; Bowman, el al., U.S. Pat. No. 5,590,032, issued Dec. 31, 1996, entitled "Self-Synchronized Drive Circuit for a Synchronous Rectifier in a Clamped-Mode Power Converter"; and Fisher, et al., U.S. Pat. No. 5,179,512, issued Jan. 12, 1993, entitled "Gate Drive for Synchronous Rectifiers in Resonant Converters." The entire disclosures of these patents are hereby incorporated herein by this reference.

However, presently known synchronous rectifier designs remain inadequate, particularly in their ability to accommodate the variability in transformer voltages, propagation delay, and high switching frequencies. A synchronous rectifier design is thus needed which addresses the shortcomings of the prior art.

BRIEF SUMMARY OF THE INVENTION

The present invention provides an integrated synchronous rectifier design which addresses many of the shortcomings of the prior art. In accordance with a preferred embodiment of the present invention, a phase detector circuit is suitably configured to detect the phase of the power magnetic on the secondary and to use the power magnetic itself as a reference source for the phase detection. The detected phase of the transformer is then utilized to turn on and off the synchronous rectifier by controlling the gate voltage to the MOSFET rectifier.

In accordance with a further aspect of the present invention, a low voltage device, for example a Schottkey diode or other suitable device, may be configured in parallel with the synchronous rectifier device to enhance performance. More particularly, the use of a Schottkey diode in parallel with the MOSFET allows voltage to be supplied at the output of the rectifier even before the control signal has fully propagated through the MOSFET, allowing for a truer representation of the active duty cycle of the input power supply as compared to presently known MOSFET rectifiers. In addition, the Schottkey diode typically enjoys a faster switching speed than a MOSFET, which permits the use of the integrated synchronous rectifier of the present invention at higher switching frequencies than would otherwise be available with the use of a simple MOSFET rectifier, without compromising average power delivered to the output.

In accordance with a further aspect of the present invention, polarity reversals of the secondary winding from the power magnetic are detected directly by the phase detector circuit, which polarity reversals are used as timing signals to control the rectifier. In accordance with a particularly preferred embodiment, the on and off condition of the rectifier is controlled by a current source which receives timing signals from the phase detector circuit. In this way, the rectifier may be controlled by an essentially constant current source, thereby eliminating problems encountered with prior art synchronous rectifiers wherein the voltage on the secondary winding may be either too high or too low to be effectively utilized by the rectifier.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

Figure 1:
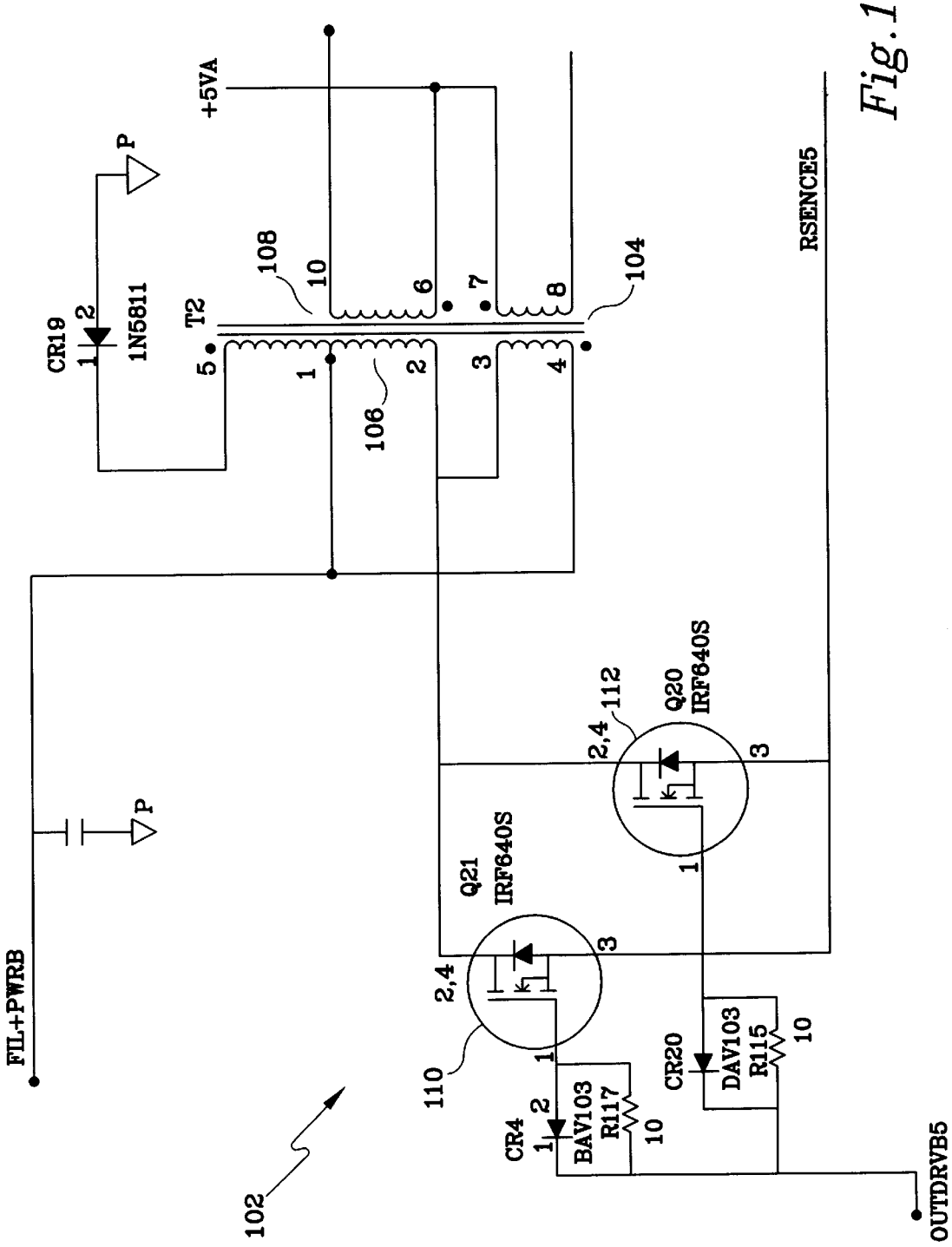
FIG. 1 is a schematic diagram of a switching circuit configured to supply input power to a power transformer, illustrating the primary winding and secondary winding of the power transformer.

Referring now to FIG. 1, a power transformer input circuit 102 suitably comprises respective switches 110 and 112 configured to apply a variable duty cycle input (e.g., a square wave) to a power transformer 104 having a primary winding 106 and a secondary winding 108 (the secondary winding 108 is variously referred to a $T_2$ herein). In accordance with a particularly preferred embodiment, respective switches 110 and 112 suitably comprise power MOSFET's, for example a conventional IRF640S available from Unitrode or Motorola. Transformer 104 suitably comprises any convenient conventional high frequency transformer known in the art.

Those skilled in the art will appreciate that the FET-implemented switch chopper front end shown in FIG. 1 may be implemented in virtually any desired configuration to provide a desired wave form—for example, representative of a desired duty cycle—to the transformer. Although the switches are implemented in a preferred embodiment as parallel FETs, it will be appreciated that virtually any device or combination of devices configured to impress a desired AC wave form onto the transformer may be used.

With continued reference to FIG. 1, secondary winding 108 is suitably configured to carry the transformer-isolated representation of the chopping implemented by the aforementioned switches.

Figure 2:
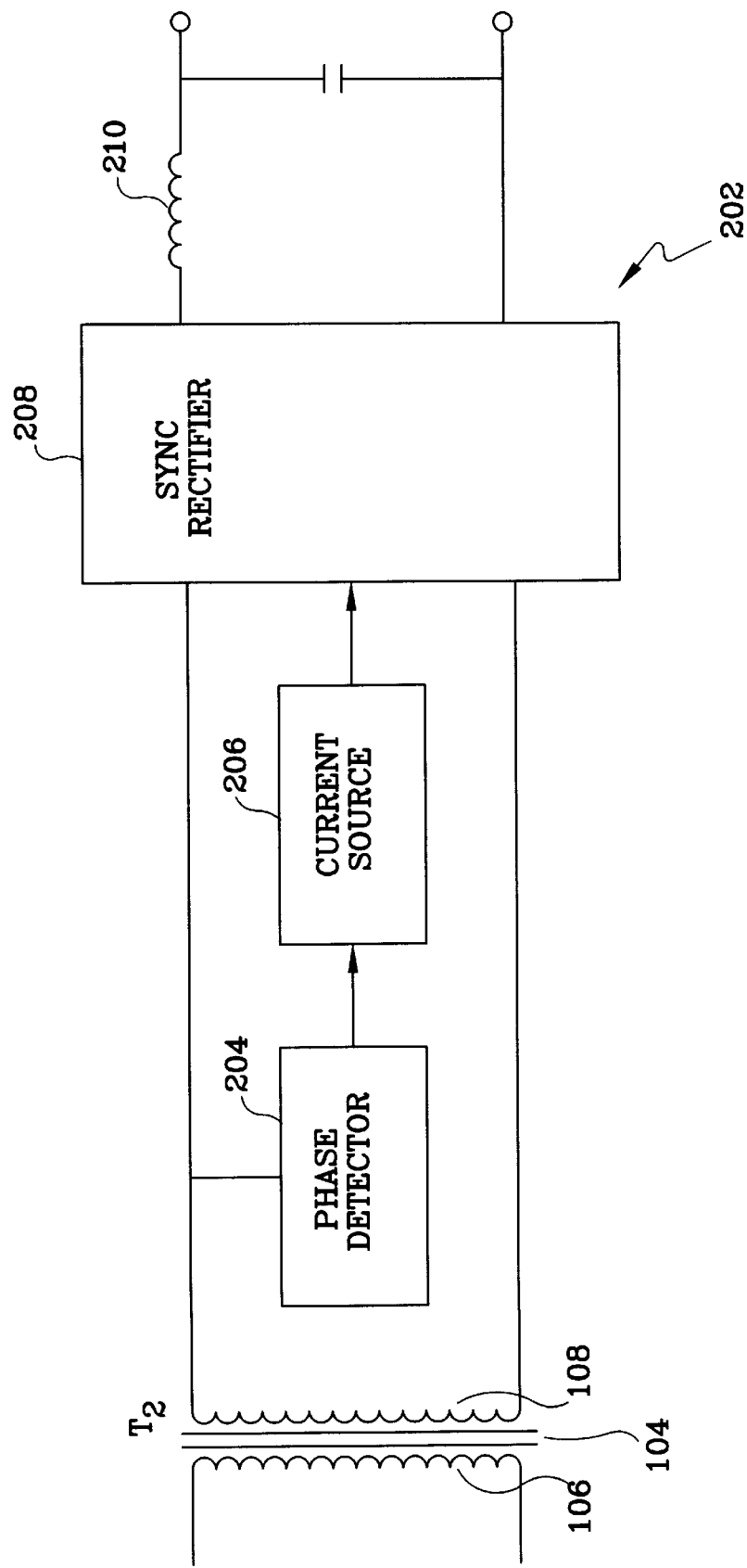
FIG. 2 is a schematic block diagram of the phase detector circuit, current source, and synchronous rectifier in accordance with a preferred embodiment of the present invention.

Referring now to FIGS. 1 and 2, the transformer-isolated output is suitably applied to an integrated synchronous rectifier circuit 202. In particular, integrated synchronous rectifier 202 suitably comprises a phase detector circuit 204, a current source 206, a synchronous rectifier circuit 208, and an output winding 210. In the context of this discussion, it will be appreciated that FIG. 2 sets forth a logical implementation of the present invention, and that the phase detector, current source, and synchronous rectifier circuits may comprise discrete circuits, or they may be integrated into one or more circuits, as desired. Indeed, virtually any number of circuits may be designed to implement the present invention, which provides a mechanism for sensing the phase (or polarity) of the secondary winding $T_2$, and utilizes this phase or polarity reversal information to generate a current used to control the synchronous rectifier. By utilizing a current source to control the synchronous rectifier, a substantially constant current may be applied to the rectifier gate, insuring proper turning on and off of the rectifier regardless of the magnitude of the voltage detected on the secondary winding. This provides important advantages over prior art systems, wherein variability in transformer voltages often resulted in blown transformers when the voltage on the secondary winding was too high, and also resulted in failure to turn the rectifier on when needed if the voltage on the secondary winding was too low to be effectively propagated through the control circuitry.

With continued reference to FIG. 2, it will be further appreciated that phase detector circuit 204 and current source 206 cooperate to turn the rectifier on when the secondary winding is conducting in the forward direction, and to turn the rectifier off when the secondary winding is in the reverse conducting direction. An illustrative implementation of an exemplary phase detector circuit and current source circuit for controlling the synchronous rectifiers will now be described in detail in conjunction with FIG. 3.

Figure 3:
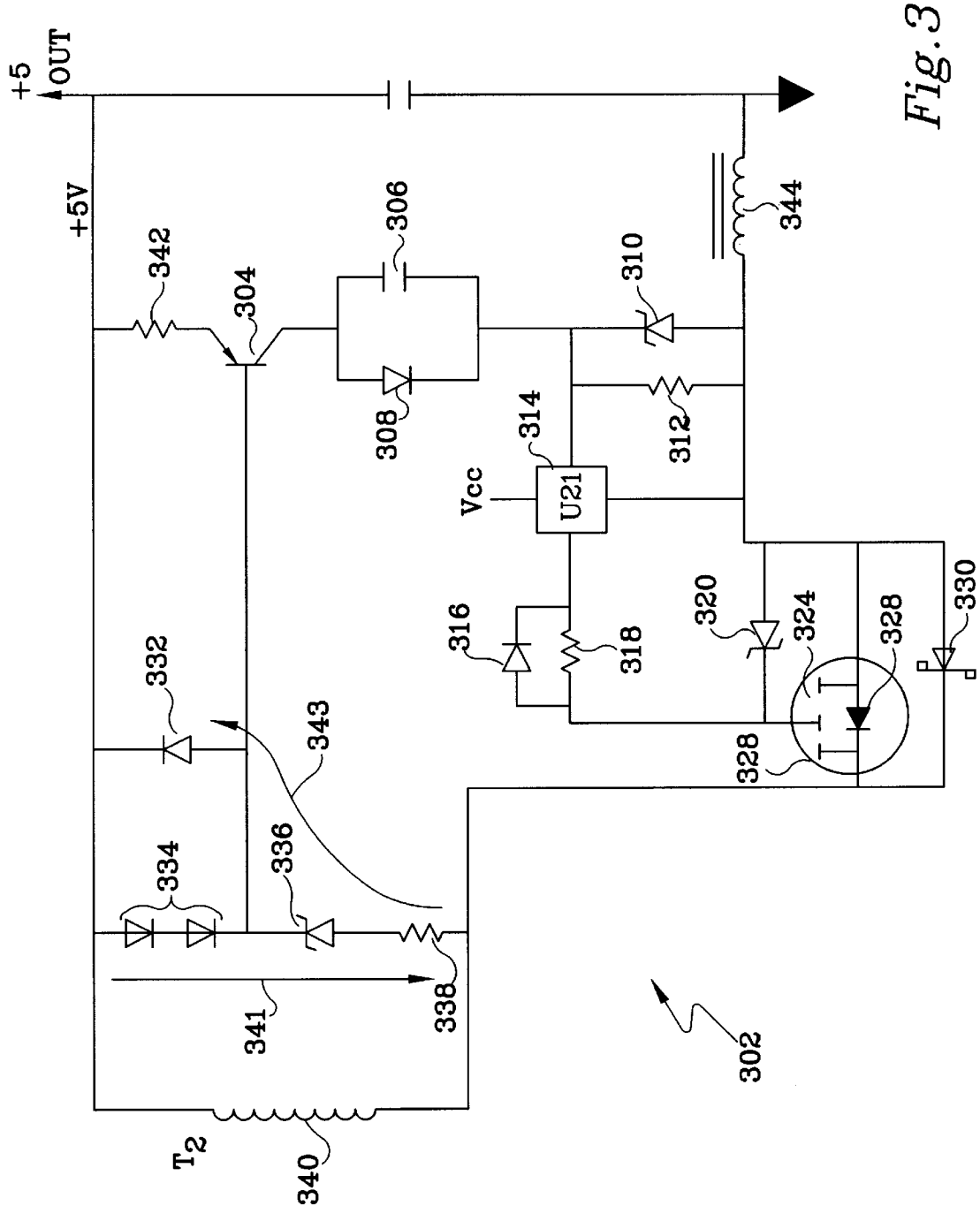
FIG. 3 is a schematic diagram of a preferred exemplary embodiment of an integrated phase detector circuit, current source circuit, and synchronous rectifier.

Referring now to FIG. 3, an integrated synchronous rectifier circuit 302 in accordance with the present invention suitably comprises a secondary winding 340 associated with the power magnetic, a voltage reference 334, a first zener diode 336 and associated resistor 338, and a first control diode 332. With momentary reference to FIGS. 1 and 2, it will be appreciated that the voltage levels appearing on secondary winding 340 of transformer $T_2$ suitably comprise transformer-isolated representations of the input wave form described above in connection with FIG. 1.

With momentary reference to FIG. 2, phase detector 204 may be implemented using any convenient arrangement of components within the scope of the present invention. Indeed, it should be emphasized that the arrangement of components set forth in FIG. 3 is merely one example of an integrated synchronous rectifier; many other circuits may be constructed which implement the principal functions of the present invention, as described herein. In that spirit, voltage reference 334, zener diode 336, resistor 338, and first control diode 332 generally correspond to the phase detector circuit shown in FIG. 2. In similar fashion, current source 206 (see FIG. 2) generally comprises a resistor 342, a transistor 304, a capacitor 306, a diode 308, a zener diode 310, a buffer 314, a resistor 312, a zener diode 320, a blocking diode 316, and a resistor 318. Finally synchronous rectifier circuit 208 (see FIG. 2) may be implemented in accordance with the illustrated embodiment as a MOSFET 328, having a blocking diode 326 and a FET 324, and a Schottkey diode 330 disposed in parallel with the MOSFET.

Before describing the details of the phase detection circuit, it is first helpful to define a forward (conducting) direction indicated by arrow 341, and a reverse (non-conducting) direction indicated by arrow 343. In the illustrated embodiment, rectifier 328 is suitably configured to be turned on (i.e., to conduct) when the voltage across secondary winding 340 is such that a current flow is induced along the forward path 341. Conversely, rectifier 328 is turned off (non-conducting) when the voltage on secondary winding 340 is such as to create a current flow along path 343 (the reverse direction).

When the voltage on secondary winding 340 in the forward direction (i.e., along the direction of arrow 341) is sufficient to exceed the breakdown voltage of zener diode 336, a current conduction path flows through voltage reference 334, zener 336, and resistor 338. The particular voltage level required to establish the aforementioned forward conduction path may be conveniently established by the selection of voltage reference 334. In the illustrated embodiment, voltage reference 334 comprises two diodes in series, thereby establishing a voltage reference on the order of 1.4 volts. However, it will be appreciated that virtually any combination of diodes, resistors, or the like may be employed to establish a desired reference voltage.

Similarly, when the voltage across secondary winding 340 in the reverse direction is sufficient to overcome the combined voltage drop associated with zener 336, resistor 338, and first control diode 332, a current path is established in the reverse direction along arrow 343. In this way, the "phase" (or polarity) of the secondary winding may be detected using the winding itself as a reference, with the phase information being utilized to control the current source such that rectifier 328 is turned on when current flows through path 341, and further wherein rectifier 328 is turned off when current flows through path 343.

More particularly, with current flowing in the forward direction along path 341, control transistor 304 is turned on. Again, the particular voltage at secondary winding 340 necessary to turn on control transistor 304 may be conveniently selected by proper selection of voltage reference 334.

With transistor 304 in the "on" condition, current flows through capacitor 306 and diode 308, establishing a voltage across resistor 312, which voltage differential is buffered by buffer 314 and applied through resistor 318 to the gate of FET 324, turning the rectifier on. Thus, with adequate voltage across winding 340 in the forward direction along arrow 341, rectifier 328 is turned on.

When the phase detector circuit detects a polarity reversal at secondary winding 340, current flows along arrow 343 through first control diode 332, thereby turning off control transistor 304. With transistor 304 in the "off" condition, current does not flow through current source elements 306 and 308, such that voltage is not applied to the gate of FET 324, so that rectifier 328 is turned off. In accordance with the illustrated embodiment, transistor 304 is suitably a PNP transistor which effectively determines the on/off state of the current source.

In accordance with the illustrated embodiment, a desired current level may be applied to rectifier 328 to controllably turn the rectifier on and off as a function of the polarity of secondary winding 340, regardless of the magnitude of the voltage present at secondary winding 340. With continued reference to FIG. 3, in accordance with a further aspect of the present invention Schottkey diode 330 may suitably be employed in parallel with rectifier 328. In this regard, it will be appreciated that the aforementioned phase detector, current source, and synchronous rectifier functions may be fully implemented with or without Schottkey diode 330. Nonetheless, Schottkey diode 330 may provide important advantages in some applications, as discussed in greater detail below.

Rectifier 328 is a relatively slow switching device as compared to Schottkey diode 330. In addition, Schottkey diode 330 generally exhibits a lower voltage drop than rectifier 328. Consequently, when current is supplied through resistor 312 as described above, and particularly on the initial leading edge of the forward power pulse of secondary winding 340, Schottkey diode 330 conducts current, allowing forward conduction earlier in time as would otherwise be achievable using only rectifier 328 inasmuch as rectifier 328 typically has a slower switching speed and a higher voltage drop than Schottkey diode 330. Thus, the use of Schottkey diode 330 in parallel with rectifier 328 allows circuit 302 to more fully exploit the forward-going duty cycle of the wave forms applied to secondary winding 340.

In the reverse direction indicated by arrow 343, rectifier 328 is turned off (as described above), and diode 308 prevents current flow in the reverse direction, while Schottkey diode 330 prevents reverse conduction across the rectifier.

With continued reference to FIG. 3, buffer 314 may be employed to buffer the voltage across resistor 312 before applying the voltage to resistor 318 and ultimately to the gate of FET 324. In this regard, zener diode 310 may be conveniently employed to protect buffer 314.

Finally, the output of rectifier 328 may be employed to drive an exemplary output power inductor 344 to thereby drive the power supply.

The subject integrated synchronous rectifier provides many advantages over presently known systems. For example, by deriving phase information directly from the secondary winding, power losses associated with prior art schemes are reduced or even eliminated. In addition, other prior art schemes involving opto-couplers, the use of separate magnetic windings for sensing secondary winding voltage and other hardware components may be eliminated, thereby reducing cost and complexity of the rectifier circuit. Complexity is further reduced in that the phase information drawn from the secondary winding may be conveniently applied directly to a suitable current source, with the output of the current source being used to control the on/off condition of the rectifier.

In accordance with a further aspect of the present invention, the rectifier may be controlled in a digital regime or in an analog regime. For example, in an alternate embodiment of the present invention, the output of the current source may be converted to a voltage timing signal used to drive an amplifier. The amplifier may suitably be powered from an auxiliary secondary winding on the power output inductor, with the amplifier being configured to yield a timing signal suitable for driving the synchronous rectifier, as desired.

The present invention has been illustrated schematically, primarily employing discrete electrical components. It will be appreciated, however, that the embodiments set forth herein are merely exemplary, and that the functions described herein may be implemented in commercially available pre-packaged chips, such as a high speed synchronous rectifier diode in a TO220 or TO247 package; indeed, virtually any combination of hardware and/or software components may be employed to implement the functions described herein without departing from the spirit and scope of the invention as set forth in the appended claims.

What is claimed is:

1. An integrated synchronous rectifier circuit for use in rectifying a transformer isolated wave form, comprising:
   a phase detector circuit configured to derive phase information from the secondary winding;
   a current source configured to receive timing signals from said phase detector circuit; and
   a synchronous rectifier operatively associated with said current source and configured to be turned on when said phase detector circuit detects a forward conduction cycle and to be turned off when said phase detector circuit detects a reverse conduction cycle.

2. The circuit of claim 1, further comprising a low power conductor disposed in parallel with said rectifier for effecting forward conduction at the leading edge of a forward conduction cycle.

3. A method for controlling a synchronous rectifier in a power supply circuit, comprising the steps of:
   apply a variable duty cycle signal to a primary winding of a power converter transformer;
   inducing a transformer-isolated wave form in a secondary winding associated with said power transformer;
   detecting phase reversals in said secondary winding;
   utilizing said detected phase reversals to generate timing information to control the output of a current source; and
   applying said output of said current source to said rectifier to thereby control the on/off state of said rectifier.

* * * * *